United States Patent
Kawakami et al.

(10) Patent No.: US 10,950,832 B2
(45) Date of Patent: Mar. 16, 2021

(54) BATTERY MODULE

(71) Applicant: TOYOTA JIDOSHA KABUSHIKI KAISHA, Toyota-shi, Aichi-ken (JP)

(72) Inventors: Masatsugu Kawakami, Shizuoka-ken (JP); Hidetoshi Okada, Nissin (JP); Yasumasa Oguma, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 16/217,233

(22) Filed: Dec. 12, 2018

(65) Prior Publication Data

US 2019/0198830 A1 Jun. 27, 2019

(30) Foreign Application Priority Data

Dec. 25, 2017 (JP) ................................. 2017-248220

(51) Int. Cl.
*H01M 10/04* (2006.01)
*H01M 2/10* (2006.01)
*H01M 2/20* (2006.01)

(52) U.S. Cl.
CPC ......... *H01M 2/1077* (2013.01); *H01M 2/206* (2013.01); *H01M 10/0481* (2013.01); *H01M 2220/20* (2013.01)

(58) Field of Classification Search
CPC ................................................ H01M 2220/20
See application file for complete search history.

(56) References Cited

U.S. PATENT DOCUMENTS

| 6,087,036 | A | * | 7/2000 | Rouillard | H01M 2/202 429/120 |
| 6,548,206 | B1 | * | 4/2003 | Gauthier | H01M 2/34 429/120 |
| 9,379,408 | B2 | * | 6/2016 | Chinnici | H01M 8/248 |
| 2008/0044714 | A1 | * | 2/2008 | Fritz | H01M 8/0202 429/433 |
| 2011/0091786 | A1 | | 4/2011 | Matsumoto et al. | |
| 2011/0151312 | A1 | | 6/2011 | Kim | |
| 2012/0121946 | A1 | * | 5/2012 | Eckstein | B60R 16/04 429/9 |
| 2014/0087231 | A1 | * | 3/2014 | Schaefer | H01M 2/1072 429/120 |

(Continued)

FOREIGN PATENT DOCUMENTS

| CA | 2306482 A1 | * | 2/1999 | ........ H01M 10/0413 |
| DE | 102008059966 B4 | * | 6/2011 | .......... H01M 10/613 |

(Continued)

*Primary Examiner* — Haroon S. Sheikh
(74) *Attorney, Agent, or Firm* — Dickinson Wright PLLC

(57) ABSTRACT

[Object] To provide a battery module that can prevent the breakage of batteries due to the expansion or contraction of the batteries when charging and discharging the batteries.
[Solution To Problem] A battery module includes a plurality of stacked batteries and a restraint part for restraining the plurality of batteries. The restraint part is composed of a pair of end plates arranged at either end in the stacking direction of the plurality of batteries and tension bands for connecting the pair of end plates and constraining the plurality of batteries in a pressurized state. The tension bands include elastically deformable concave-convex parts.

5 Claims, 6 Drawing Sheets

(56) References Cited

U.S. PATENT DOCUMENTS

2014/0106199 A1    4/2014   Meintschel et al.
2017/0110695 A1    4/2017   Nishikawa et al.

FOREIGN PATENT DOCUMENTS

| | | | | |
|---|---|---|---|---|
| JP | 2004349202 | A | 12/2004 | |
| JP | 2010-003636 | A | 1/2010 | |
| JP | 2010244894 | A | 10/2010 | |
| JP | 4621815 | B2 | 1/2011 | |
| JP | 2011023302 | A | 2/2011 | |
| JP | 2014510381 | A | 4/2014 | |
| JP | 2015-076188 | A | 4/2015 | |
| JP | 2015-207553 | A | 11/2015 | |
| KR | 20110072910 | A | 6/2011 | |
| KR | 20160115533 | A | 10/2016 | |
| WO | WO-2014167019 | A1 * | 10/2014 | .......... H01M 2/1022 |

* cited by examiner

STACKING DIRECTION

FIG. 5
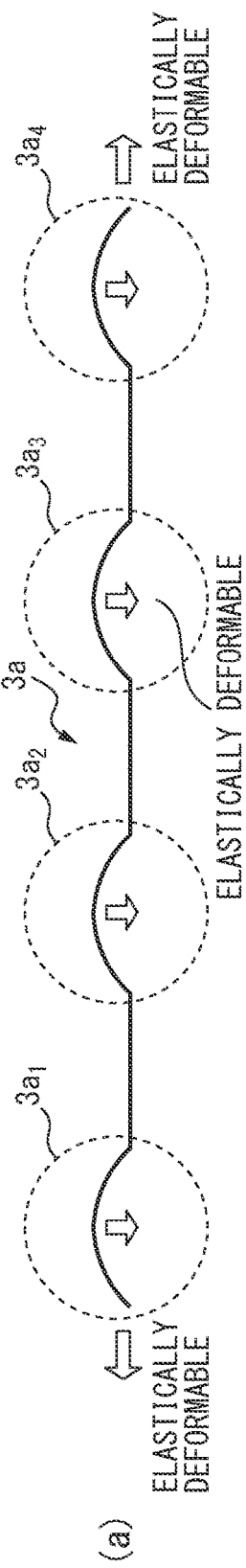
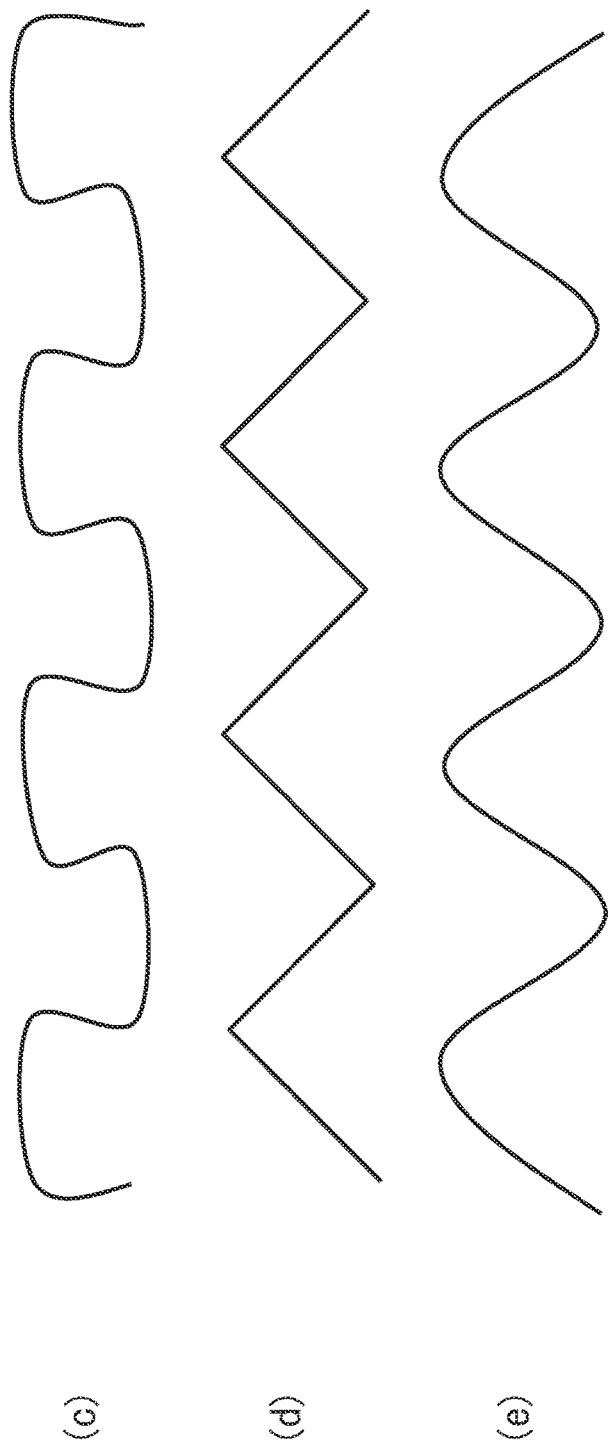

BATTERY MODULE

FIELD

The present disclosure relates to a battery module. In particular, the present disclosure relates to a battery module comprising a plurality of stacked batteries and a restraint part for restraining the plurality of batteries.

BACKGROUND

In recent years, various battery modules have been disclosed.

For example, PTL 1 discloses a battery module in which a battery block formed by stacking a plurality of unit cells is secured using end plates arranged at both ends of the battery block and a metal band that connects the end portions of the end plates.

PTL 2 discloses a fuel cell module comprising a fastening member for fastening end plates arranged on opposite ends of a battery stack in the stacking direction of the battery stack.

PTL 3 discloses a battery module in which a battery laminate is restrained by a pressing plate, a deformable plate, and end plates.

Furthermore, PTL 4 discloses a fuel cell module comprising end plates including protruding regions.

CITATION LIST

Patent Literature

[PTL 1] Japanese Unexamined Patent Publication (Kokai) No. 2015-207553
[PTL 2] Japanese Unexamined Patent Publication (Kokai) No. 2010-003636
[PTL 3] Japanese Unexamined Patent Publication (Kokai) No. 2015-076188
[PTL 4] Japanese Patent No. 4621815

SUMMARY

Technical Problem

In a battery module having a structure in which a plurality of stacked batteries are restrained, expansion and contraction of the batteries may occur during charging and discharging. Thus, when restraining such a plurality of batteries using a pair of end plates arranged on either end of a plurality of stacked batteries in the stacking direction and a tension band restraining the plurality of batteries in a pressurized state by connecting the pair of end plates, with the expansion or contraction of the batteries, a load greater than the appropriate restraining force may be exerted on the tension band, which may cause the tension band to plastically deform and become damaged.

Thus, it is an object of the present disclosure to provide a battery module capable of preventing such a problem.

Solution to Problem

The inventors of the present invention have discovered that the above-described problem can be solved by the following means.

<Aspect 1>
A battery module, comprising a plurality of stacked batteries and a restraint part for restraining the plurality of batteries,
wherein the restraint part is composed of a pair of end plates arranged at either end in the stacking direction of the plurality of batteries and a tension band for connecting the pair of end plates and constraining the plurality of batteries in a pressurized state, and
wherein the tension band includes an elastically deformable concave-convex part.
<Aspect 2>
The battery module according to aspect 1, wherein the concave-convex part is disposed only on a portion facing a side surface of the end plates.
<Aspect 3>
The battery module according to aspect 1 or 2, further comprising an intermediate plate between the plurality of batteries.
<Aspect 4>
The battery module according to aspect 3, wherein the concave-convex part is disposed only on a portion facing at least one side surface of the end plates and the intermediate plate.
<Aspect 5>
The battery module according to any one of aspects 1 to 4, wherein the tension band is composed of a metal or a fiber-reinforced plastic.
<Aspect 6>
The battery module according to any one of aspects 1 to 5, wherein the concave-convex part is formed by an embossing process.
<Aspect 7>
The battery module according to any one of aspects 1 to 6, wherein the plurality of batteries are all-solid-state batteries.

Advantageous Effect of Invention

According to the battery module of the present disclosure, breakage of the tension band due to the expansion and contraction of the batteries can be prevented.

BRIEF DESCRIPTION OF DRAWINGS

FIG. 5 is a schematic cross-sectional view exemplarily showing the shape of a concave-convex part according to the present disclosure.

DESCRIPTION OF EMBODIMENTS

Figure 1:
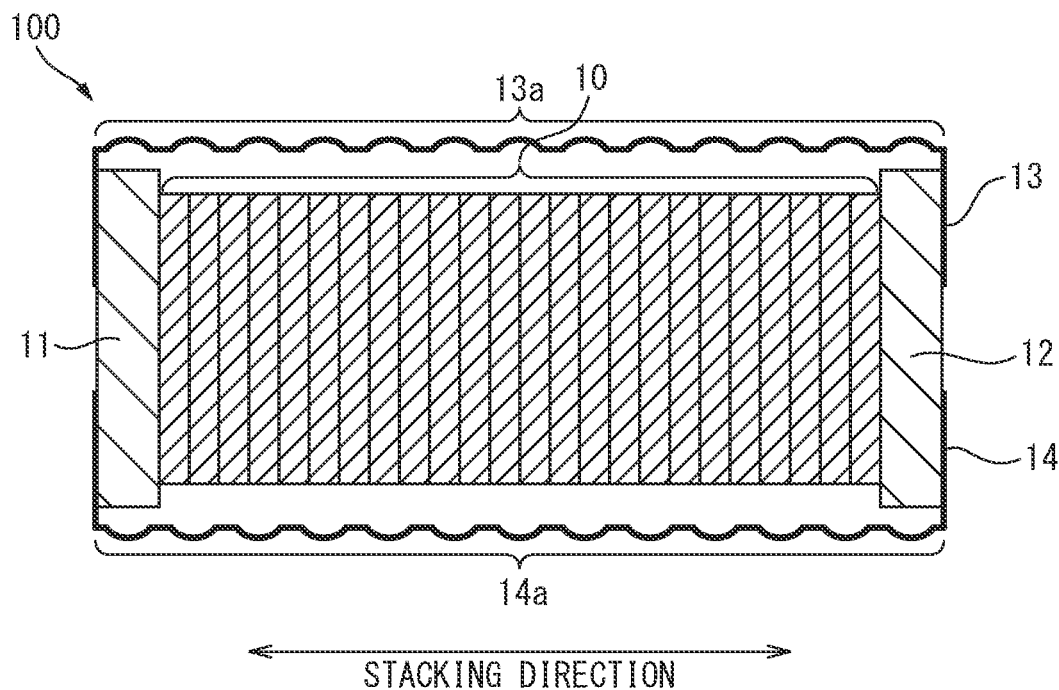
FIG. 1 is a schematic cross-sectional view showing one embodiment of a battery module of the present disclosure.

The embodiments of the present disclosure will be described in detail below with reference to the drawings.

Note that, the present disclosure is not limited to the following embodiments and various modifications can be made within the scope of the gist of the present disclosure. Furthermore, in the explanation of the drawings, the same components are given the same reference numerals, and duplicate explanations therefor are omitted. The forms shown in the drawings below are examples of the present disclosure and do not limit the present disclosure.

The battery module of the present disclosure is:
a battery module, comprising a plurality of stacked batteries and a restraint part for restraining the plurality of batteries, wherein the restraint part is composed of a pair of end plates arranged at either end in the stacking direction of the plurality of batteries and a tension band for connecting the pair of end plates and constraining the plurality of batteries in a pressurized state, and
wherein the tension band includes an elastically deformable concave-convex part.

Furthermore, in the present disclosure, the phrase "elastic deformation" means the deformation of an object by the application of an external force, whereby when the force is removed, the object returns to its original shape. Conversely, the phrase "plastic deformation" means a deformation of an object by the application of an external force which remains even if the external force is removed.

FIG. 1 is a schematic cross-sectional view showing one embodiment of the battery module of the present disclosure. As shown in FIG. 1, the battery module 100 includes a plurality of stacked batteries 10 and a restraint part for retraining the plurality of batteries 10. The restraint part is composed of a pair of end plates 11 and 12 which are arranged on either end in the stacking direction of the plurality of stacked batteries 10 and tension bands 13 and 14 which connect the pair of end plates 11 and 12 and restrain the plurality of batteries 10 in a pressurized state. The tension band 13 includes an elastically deformable concave-convex part 13*a* and the tension band 14 includes an elastically deformable concave-convex part 14*a*.

Figure 2:
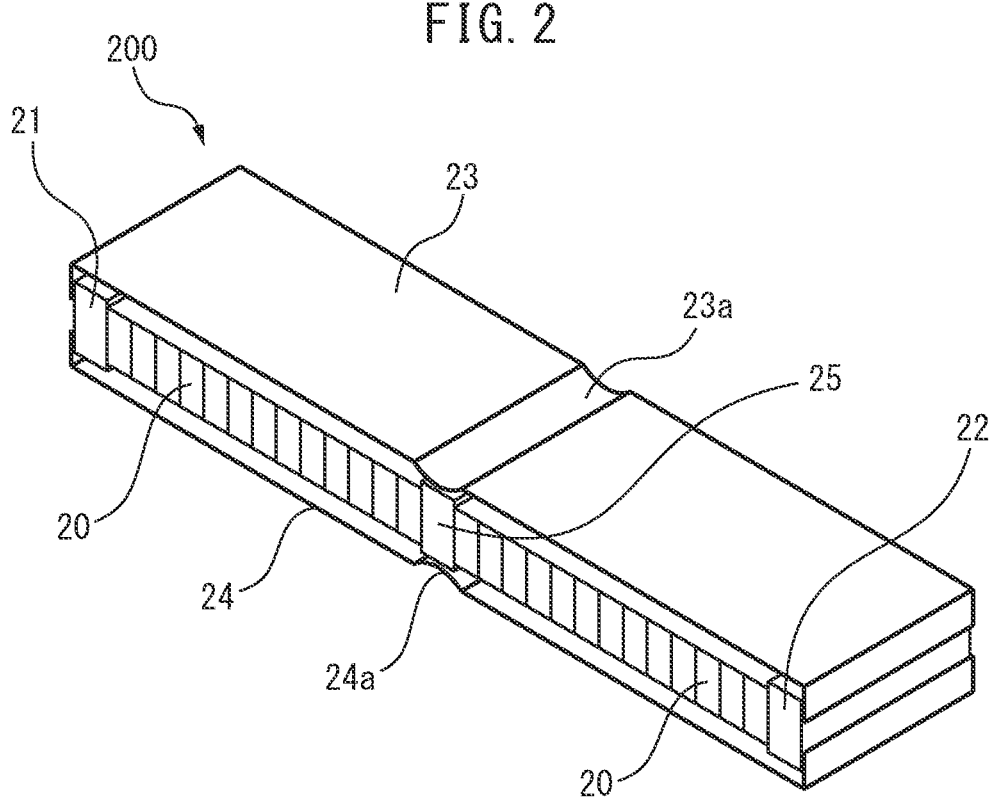
FIG. 2 is a perspective view showing the exterior of one embodiment of the battery module of the present disclosure.

Furthermore, FIG. 2 is a perspective view showing the exterior of one embodiment of the battery module of the present disclosure. The battery module 200 includes a plurality of stacked batteries 20, a restraint part, and as another component, an intermediate plate 25 arranged between the plurality of batteries 20. The restraint part is composed of a pair of end plates 21 and 22, which are arranged on either end of the plurality of batteries 20 in the stacking direction, and tension bands 23 and 24 which connect the pair of end plates 21 and 22 and restrain the plurality of batteries 20 in a pressurized state. The tension band 23 includes an elastically deformable concave-convex part 23*a*. The concave-convex part 23*a* is disposed only on the portion of the tension band 23 facing a side surface of the intermediate plate 25. Similarly, the tension band 24 includes an elastically deformable concave-convex part 24*a*. The concave-convex part 24*a* is disposed only on the portion of the tension band 24 facing a side surface of the intermediate plate 25. Note that the intermediate plate 25 is described later.

The battery module of the present disclosure can prevent tension band breakage due to the expansion or contraction of the batteries. This mechanism is explained below. Note that such a mechanism does not limit the present disclosure.

As described above, when expansion and contraction of the batteries occurs while charging or discharging the batteries, if the load applied to the tension band used in the conventional battery module becomes greater than the appropriate restraining force, the tension band may plastically deform and break at an arbitrary location.

Figure 3:
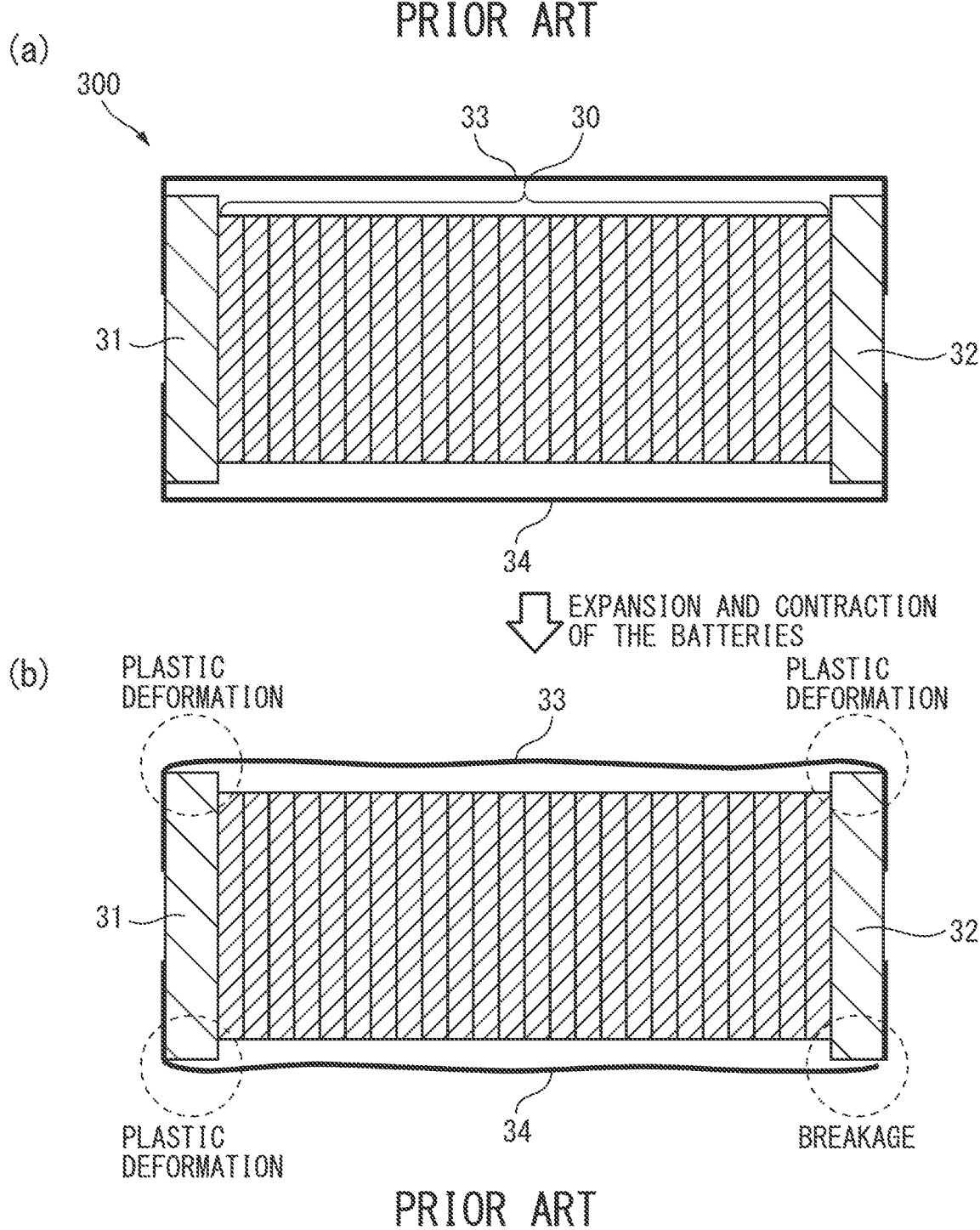
FIG. 3 is a schematic cross-sectional view showing one embodiment in which the tension band of a conventional battery module is plastically deformed.

For example, the conventional battery module 300 shown in FIG. 3(*a*) includes a plurality of stacked batteries 30 and a restraint part for restraining the plurality of batteries 30. This restraint part is composed of a pair of end plates 31 and 32 which are arranged on either end of the plurality of batteries 30 in the stacking direction and tension bands 33 and 34 which connect the pair of end plates 31 and 33, and which restrain the plurality of batteries 30 in a pressurized state. The tension bands 33 and 34 do not include elastically deformable concave-convex parts. When the plurality of batteries 30 expand and contract, the tension bands 33 and 34 plastically deform at arbitrary locations, and there are locations at which breakage occurs, as shown in FIG. 3(*b*).

Contrary to the conventional battery module, in the battery module of the present disclosure, the tension band includes an elastically deformable concave-convex part. Thus, when the batteries expand and contract, such concave-convex part preferentially elastically deforms. In this way, the concave-convex part can absorb the load on the tension band due to the dimensional change caused by expansion and contraction of the batteries. As a result, it is possible to prevent the tension band from plastically deforming and breaking.

In other words, for example, in the battery module 100 shown in FIG. 1, even if the plurality of batteries 10 expand and contract, breakage of the tension bands 13 and 14 due to plastic deformation can be prevented by the preferential elastic deformation of the concave-convex part 13*a* of the tension band 13 and the concave-convex part 14*a* of the tension band.

<<Plurality of Batteries>>

The battery module includes a plurality of stacked batteries.

A "plurality" means two or more. In other words, it is sufficient that the battery module of the present disclosure include two or more stacked batteries. In the present disclosure, the upper limit of the number of the plurality of batteries is not particularly limited and can be set in accordance with the intended use or object of the battery module.

In the present disclosure, the type of battery is not particularly limited. For example, primary battery, secondary battery, or fuel cell may be used. From among these, the plurality of batteries according to the present disclosure are preferably all-solid-state batteries, in which all of the components constituting the battery, including the electrolyte, are solid.

<All-Solid-State Battery>

The case in which the plurality of batteries according to the present disclosure are all-solid-state batteries will be described in detail below.

As the type of all-solid-state battery, all-solid-state lithium battery, all-solid-state sodium battery, all-solid-state magnesium battery, all-solid-state calcium battery or the like can be used. From among these, all-solid-state lithium battery and all-solid-state sodium battery are preferable, and all-solid-state lithium battery are particularly preferable. Furthermore, the all-solid-state battery may be a primary battery or may be a secondary battery. From among these, secondary battery is preferable.

The all-solid-state batteries can include one or more all-solid-state unit cells. Furthermore, the all-solid-state unit cell is composed of a positive electrode current collector layer, a positive electrode active material layer, a solid electrolyte layer, a negative electrode active material layer, and a negative electrode current collector layer which are stacked in this order. Further, when the all-solid-state battery includes two or more all-solid-state unit cells, the all-solid-state battery may be of a bipolar type or a monopolar type, depending on the stacking order of the constituent layers.

The constituent members of the positive electrode current collector layer, positive electrode active material layer, solid electrolyte layer, negative electrode active material layer, and negative electrode current collector layer are not particularly limited. Any known members which are applicable to an all-solid-state battery can be used.

<<Restraint Part>>

The battery module includes a restraint part for restraining the above-described plurality of batteries.

The restraint part is composed of a pair of end plates which are arranged on either end of the plurality of batteries in the stacking direction and a tension band (or bands) which connects the pair of end plates and restrains the plurality of batteries in a pressurized state.

<Tension Band>

As long as the plurality of batteries can be restrained in a pressurized state, the tension band can be composed of any known member. For example, the tension band may be composed of a metal, a fiber-reinforced plastic, or the like. Stainless steel can be used as the metal. Furthermore, for example, carbon fiber-reinforced plastic, glass fiber-reinforced plastic or the like can be used as the fiber-reinforced plastic. However, the tension band is not limited thereto.

In the present disclosure, the tension band includes an elastically deformable concave-convex part. The elastically deformable concave-convex part will be explained in detail below. Note that the "elastically deformable concave-convex part" may sometimes be referred to as simply the "concave-convex part".

(Concave-Convex Part)

In the present disclosure, the concave-convex part can be disposed at any portion of the tension band. For example, in the battery module 100 shown in FIG. 1, the concave-convex part 13*a* is disposed on the entire portion facing the side surfaces of the plurality of batteries 10 in the stacking direction and facing the side surfaces of the end plates 11 and 12. Note that though the concave-convex parts 13*a* and 14*a* shown in FIG. 1 are drawing symmetrically, they may also be disposed in asymmetrical locations.

In the present disclosure, the concave-convex parts are preferably disposed only on the portions which face the side surfaces of the end plates. The reason for this is described below. Note that the side surfaces of the end plates are the side surfaces of the end plates perpendicular to the stacking direction of the plurality of batteries.

In the battery module in which the concave-convex part of the tension band is disposed only in the portions facing the side surface of the end plates, not only breakage of the tension band due to expansion or contraction of the above-described batteries can be prevented, but also when a strong external force (for example, a side collision of a vehicle) is received in the stacking direction of the plurality of batteries, the concave-convex parts preferentially buckle and elastically deform, and in some cases plastically deforms, whereby it is possible to prevent the entire tension band from becoming deformed. In other words, when a strong external force is received in the stacking direction of the plurality of batteries, it is possible to control the deformed portion of the tension band. As a result, breakage of the batteries can be prevented by the contact between the deformed portion of the tension band and the batteries.

More specifically, when the batteries are compressed by a strong external force received in the stacking direction of the plurality of batteries, thereby buckling the tension band, if a concave-convex part is present in the tension band, buckling of the tension band occurs preferentially in the concave-convex part. In other words, even if the concave-convex part buckles, since the concave-convex part is disposed only in the portion of the tension band facing the side surfaces of the end plates and the buckled portion does not come into contact with the batteries, it is possible to prevent breakage of the batteries due to contact with the buckled portion.

Figure 4:
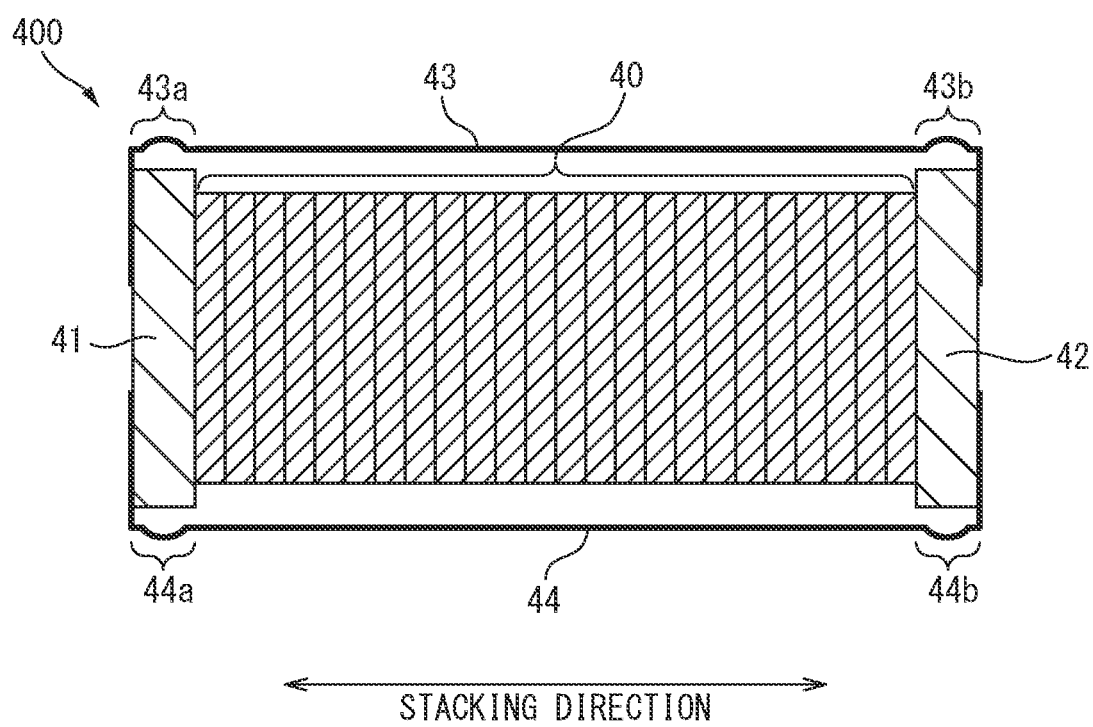
FIG. 4 is a schematic cross-sectional view showing one embodiment of the battery module of the present disclosure.

For example, in the battery module 400 shown in FIG. 4, the concave-convex parts 43*a* and 43*b* of the tension band 43 are disposed only in the portions of the side facing the side surfaces of the end plates 41 and 43. Likewise, the concave-convex parts 44*a* and 44*b* of the tension band 44 are disposed only in the portions of the side facing the side surfaces of the end plates 41 and 42.

In the battery module 400, when the plurality of batteries 40 expand and contract, the concave-convex parts 43*a*, 43*b*, 44*a*, and 44*b* preferentially elastically deform, whereby plastic deformation and breakage of the tension bands 43 and 44 can be prevented. Furthermore, when a strong external force is received in the stacking direction of the plurality of batteries 40 of the battery module 400, the concave-convex parts 43*a*, 43*b*, 44*a*, and 44*b* preferentially deform. In this case, even if the concave-convex parts 43*a*, 43*b*, 44*a*, and 44*b* buckle, since the buckled portion (any one or more portions of the concave-convex parts 43*a*, 43*b*, 44*a*, and 44*b*) of the tension band does not contact the plurality of batteries 40, breakage of the batteries can be prevented.

Note that the battery module of the present disclosure can include one or more tension bands. At least one of these tension bands includes a concave-convex part. Concave-convex parts can be disposed at arbitrary locations on the one or plurality of tension bands in accordance with the required object and use of the battery module.

In the present disclosure, as long as the concave-convex part of the tension band is capable of elastically deforming, it is not particularly limited and can have any shape. The concave-convex part may be composed of only a concave part, may be composed of only a convex part, or may be composed of a combination of a concave part and a convex part. In FIGS. 5(*a*) to (*e*), several shapes of concave-convex parts are exemplarily shown, but the present disclosure is not limited thereto.

The concave-convex part 3*a* shown in FIG. 5(*a*) is described as an example. The concave-convex part 3*a* includes four convex parts $3a_1$, $3a_2$, $3a_3$, and $3a_4$. Each of the convex part is elastically deformable along the direction of the arrow. Note that each of the 4 convex parts $3a_1$, $3a_2$, $3a_3$, and $3a_4$ may be of the same size and direction or may be of different sizes and directions. Note that in FIG. 5(*a*), the four convex parts $3a_1$, $3a_2$, $3a_3$, and $3a_4$ may be uniformly spaced, but may also not be uniformly spaced, or the four convex parts $3a_1$, $3a_2$, $3a_3$, and $3a_4$ may be continuous.

Figure 6:
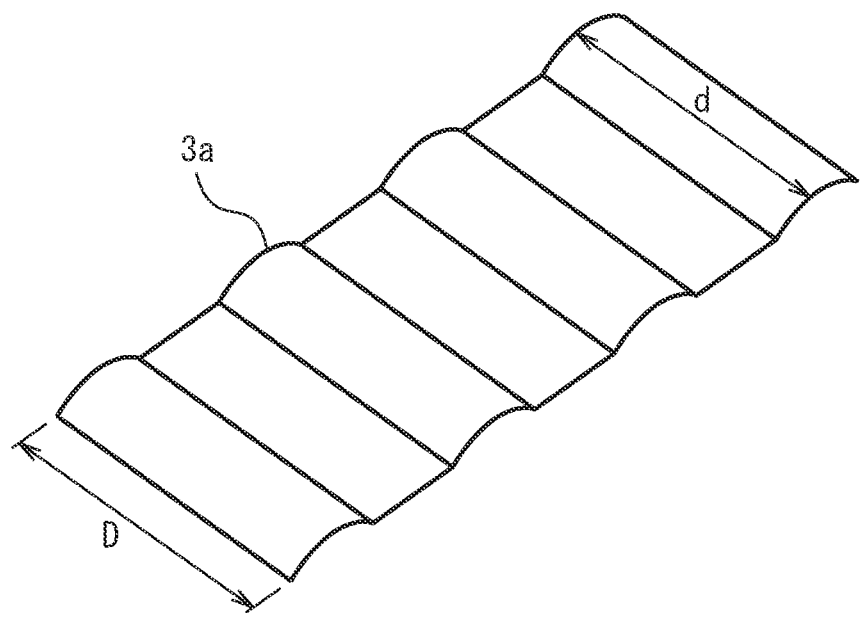
FIG. 6 is a perspective view showing one embodiment of the concave-convex part according to the present disclosure.

Furthermore, FIG. 6 is a perspective view of the concave-convex part 3*a* shown in FIG. 5(*a*). In the example of the concave-convex part 3*a* shown in FIG. 6, the width d of the concave-convex part 3*a* is the same as the width D of the tension band. In other words, the concave-convex parts 3*a* can be provided so as to extend from edge to edge of the width D of the tension band. The width of the tension band refers to the length of the plane perpendicular to the stacking direction of the plurality of batteries and the width of the concave-convex part refers to the length of the concave or convex shape of the surface parallel to the width of the tension band. Furthermore, as long as the effect of the present disclosure is not impaired, the width of the concave-convex part may be set smaller than the width of the tension band.

In the present disclosure, the concave-convex part of the tension band can be formed by applying a concave and/or convex shape by a known method. For example, the concave-convex part can be formed by an embossing process.

<End Plates>

In the battery module of the present disclosure, the pair of end plates are arranged at either end in the stacking direction of the plurality of batteries and are connected by the tension band. In the present disclosure, the restraint part is composed of the pair of end plates and the above-described tension band.

The end plates are not particularly limited and can be composed of any known members. For example, the end plates may be composed of a metal or a fiber-reinforced plastic. As the metal, stainless steel can be used. Furthermore, as the fiber-reinforced plastic, for example, carbon fiber-reinforced plastic, glass fiber reinforced plastic, or the like can be used. The end plates are not limited thereto.

<<Other Component>>

In the present disclosure, the battery module may include one or more components other than the above-described plurality of stacked batteries and the restraint part which restrains the plurality of batteries, in accordance with the desired use and object of the battery module. For example, an intermediate plate may be further included between the plurality of batteries. An embodiment of the module of the present disclosure when an intermediate plate is included as the other component will be exemplarily described below.

<Intermediate Plate>

The battery module of the present disclosure may further include an intermediate plate. Since the intermediate plate can serve as a spacer for ensuring insulation between the plurality of batteries, the battery module of the present disclosure preferably further includes an intermediate plate. For example, the plurality of batteries constituting the battery module can be divided into a plurality of battery groups, each having a plurality of batteries, by the intermediate plate. In this case, the divided battery groups can be connected with other battery groups to achieve high voltage and high capacity. Furthermore, in this case, even if one of the battery groups becomes damaged, the remaining battery groups can remain operable. Moreover, in this case, by using each of the battery groups to drive either front wheels or back wheels, a four-wheel drive can be realized.

Furthermore, when an intermediate plate is further included in the battery module of the present disclosure, it is preferable that the concave-convex part of the tension band is disposed only on a portion facing at least one side surface of the end plates and the intermediate plate. As a result, not only breakage of the tension band can be prevented, but breakage of the batteries when a strong external force is received in the stacking direction of the plurality of batteries can also be prevented. Further, from the viewpoint of balance of the restraining effect of the tension band on the plurality of batteries, the concave-convex parts of the tension bands may be disposed only on the portions facing the side surfaces of the intermediate plate. Note that "side surfaces of the intermediate plate" means the side surfaces of the intermediate plate perpendicular to the stacking direction of the plurality of batteries.

Figure 7:
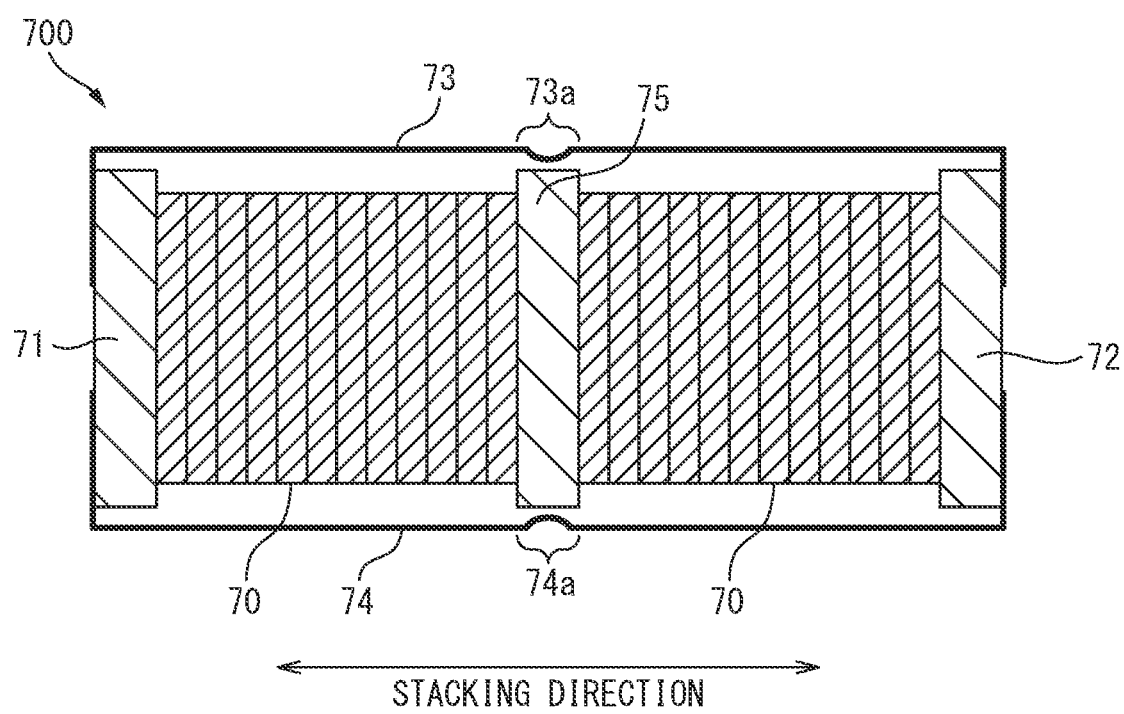
FIG. 7 is a schematic cross-sectional view showing one embodiment of the battery module of the present disclosure.

FIG. 7 shows an example of one embodiment of the case in which an intermediate plate is further included between the plurality of batteries. The battery module 700 further includes an intermediate plate 75 between the plurality of batteries 70. In this case, the concave-convex part 73a of the tension band 73 is disposed only on a portion facing the side surface of the intermediate plate 75. Similarly, the concave-convex part 74a of the tension band 74 is disposed only on a portion facing the side surface of the intermediate plate 75. As a result of this configuration, not only can breakage of the tension bands 73 and 74 be prevented, but breakage of the batteries when a strong external force is received in the stacking direction of the plurality of batteries 70 can also be prevented.

Furthermore, according to the above configuration, breakage of the batteries can be prevented when a strong force is received in the stacking direction of the plurality of batteries 70.

Figure 8:
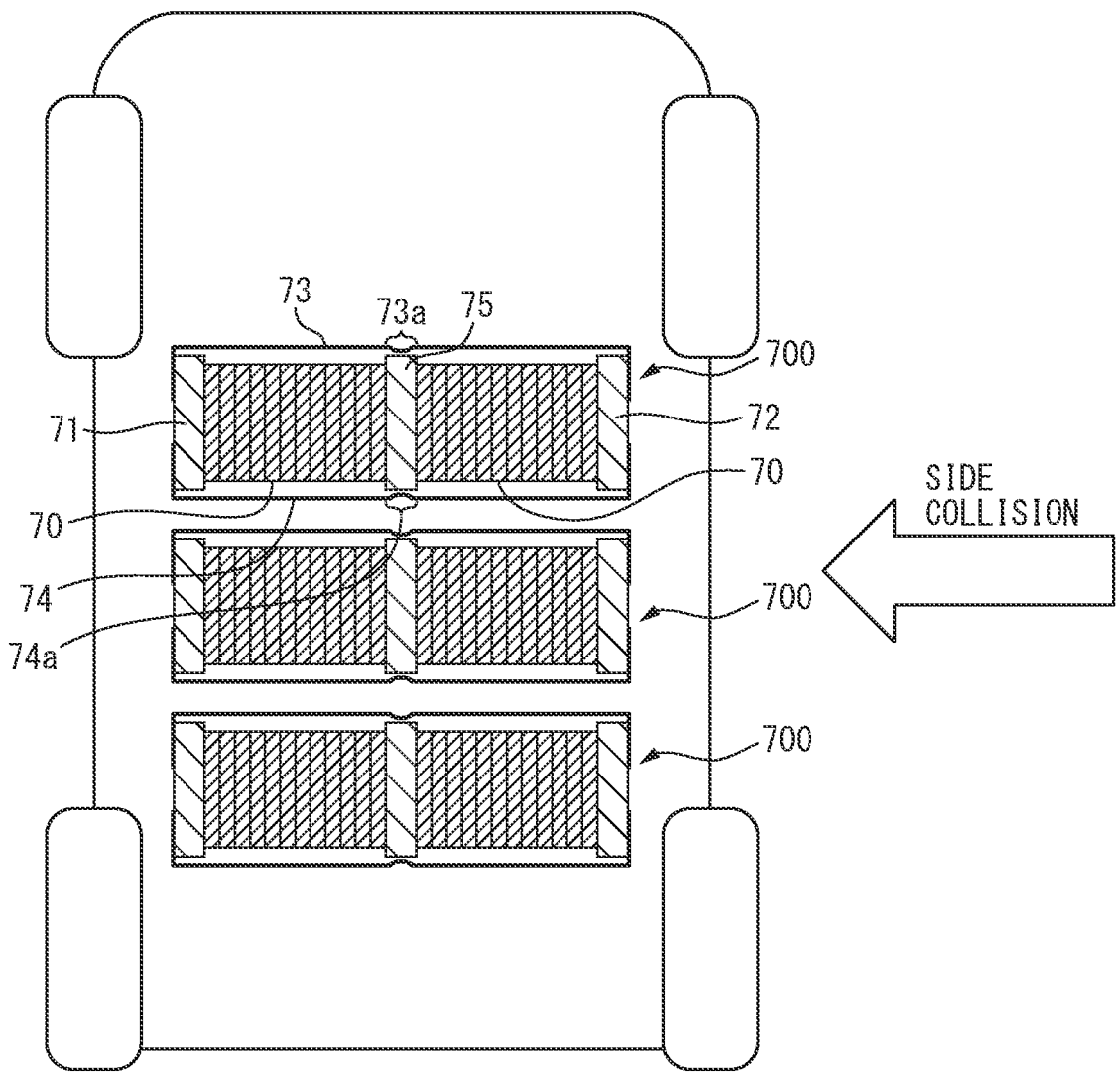
FIG. 8 is a schematic view showing one embodiment of the battery module of the present disclosure when mounted in a vehicle.

A schematic view showing one embodiment of the battery module 700 when mounted in a vehicle is shown in FIG. 8. In the configuration shown in FIG. 8, the tension bands 73 and 74 are arranged in a state perpendicular to the ground, and the battery laminate is arranged therebetween. However, it may also be possible to arrange in a form in which the tension band is rotated 90° around the stacking direction of batteries, i.e., the tension band is arranged horizontally with respect to the ground, so that the battery laminate is arranged therebetween.

In FIG. 8, in the battery module 700, which is mounted on a vehicle, the concave-convex parts 73a and 74a of the tension bands 73 and 74 are disposed only in portions facing the side surfaces of the intermediate plate 75. Thus, even if the concave-convex parts 73a and 74a buckle due to a strong external force as a result of a side collision of the vehicle, since such buckling sites (concave-convex parts 73a and/or 74a) do not contact the plurality of batteries 70, breakage of the batteries can be prevented.

REFERENCE SIGNS LIST 10, 20, 30, 40, 70 plurality of batteries
11, 12, 21, 22, 31, 32, 41, 42 end plate
13, 14, 23, 24, 33, 34, 43, 44, 73, 74 tension band
3a, 13a, 14a, 23a, 24a concave-convex part
3a1, 3a2, 3a3, 3a4 convex part
43a, 43b, 44a, 44b, 73a, 74a concave-convex part
25, 75 intermediate plate
100, 200, 300, 400, 700 battery module

The invention claimed is:

1. A battery module, comprising a plurality of stacked batteries, a restraint part for restraining the plurality of batteries, and an intermediate plate between the plurality of batteries,
   wherein the restraint part is comprised of a pair of end plates arranged at either end in the stacking direction of the plurality of batteries and a tension band for connecting the pair of end plates and constraining the plurality of batteries in a pressurized state, and
   wherein the tension band includes an elastically deformable concave-convex part, and
   wherein the concave-convex part is disposed only on a portion facing at least one side surface of the end plates and the intermediate plate.

2. The battery module according to claim 1, wherein the concave-convex part is disposed only on a portion facing at least one side surface of the end plates and the intermediate plate.

3. The battery module according to claim 1, wherein the tension band is composed of a metal or a fiber-reinforced plastic.

4. The battery module according to claim 1, wherein the concave-convex part is formed by an embossing process.

5. The battery module according to claim 1, wherein the plurality of batteries are all-solid-state batteries.

* * * * *